INVENTORS:
BLAIR S. KRATZER,
NATHANIEL L. ROSIN,
BY
Attorney.

Feb. 6, 1968   B. S. KRATZER ET AL   3,367,633
ANTI-FOULING DEVICE FOR CABLE HOIST
Filed Oct. 1, 1963   4 Sheets-Sheet 3

INVENTORS:
BLAIR S. KRATZER,
NATHANIEL L. ROSIN,
BY
*T. Wayne Rodgers*
Attorney.

Feb. 6, 1968  B. S. KRATZER ET AL  3,367,633
ANTI-FOULING DEVICE FOR CABLE HOIST
Filed Oct. 4, 1963  4 Sheets-Sheet 4
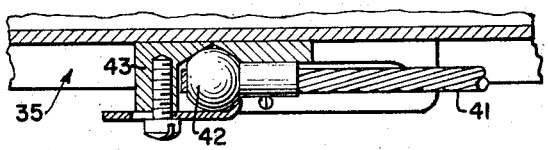
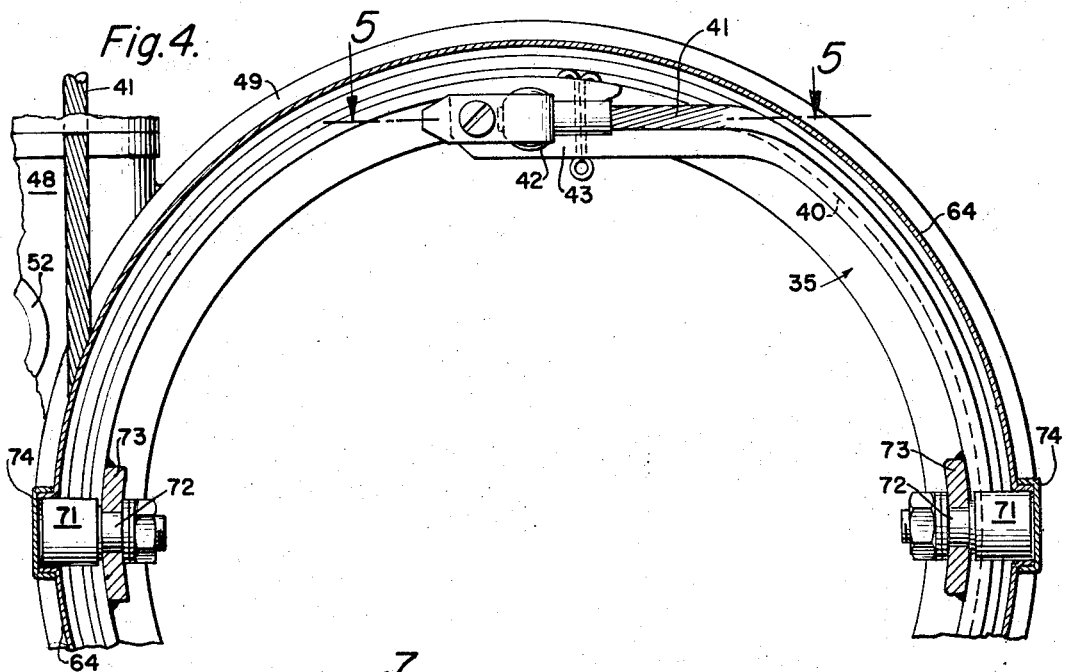
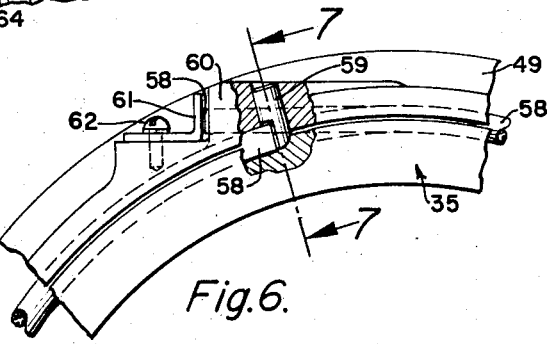
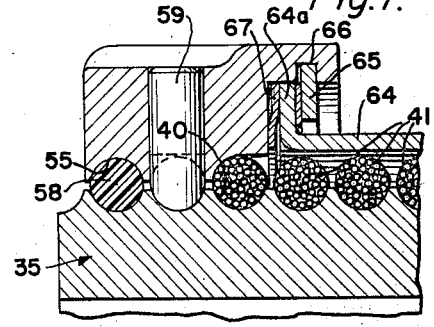
INVENTORS:
BLAIR S. KRATZER,
NATHANIEL L. ROSIN,
BY
*T. Wayne Rodgers*
Attorney.

United States Patent Office 3,367,633
Patented Feb. 6, 1968

3,367,633
ANTI-FOULING DEVICE FOR CABLE HOIST
Blair S. Kratzer and Nathaniel L. Rosin, Torrance, Calif., assignors to The Garrett Corporation, Los Angeles, Calif., a corporation of California
Filed Oct. 4, 1963, Ser. No. 313,958
5 Claims. (Cl. 254—186)

The present invention relates generally to a hoist employing a cable wound on a rotatable drum; and more particularly it is concerned with anti-fouling means associated with the drum for preventing the cable from springing away from the drum under no-load conditions when tension in the cable is released and no longer holds the cable tightly against the drum.

In the normal operation of cable and drum hoists, difficulties are often encountered in keeping the cable tightly wound around the drum. When the cable is loaded, the tension in the cable pulls it tightly against the drum and keeps the several turns of cable around the drum in tight engagement therewith. However, when the load on the cable is released, and more particularly when the cable is being reeled out under no-load conditons, the natural resilience and springiness of the cable, especially in the case of wire cables, causes the cable to tend to straighten and move outwardly away from the drum. If this occurred only to a slight extent, it would not be objectionable; but it often occurs to such an extent that one or more turns of the cable may move far enough away from the drum to become fouled on adjoining turns or between the drum and its cover. This fouling action seems to be irreversible in that any movement tends to jam the turns of the cable more tightly and to resist any tendency to straighten them. The result is that a fouling of the cable develops very rapidly and can entirely incapacitate the hoist for useful operation.

Accordingly, it is a general object of the present invention to provide anti-fouling means for a cable hoist which keeps the successive turns of cable on the drum in position on the drum for all ordinary operating conditions.

Another object of the invention is to provide an anti-fouling means for a cable hoist having a helically wound groove in the drum in which the cable retaining means moves axially of the drum in unison with the point of delivery of the cable from the drum.

Another object of the present invention is to provide an anti-fouling device for a cable hoist in which the cable retaining means does not come into contact or engagement with the turns of the cable on the drum.

These objects of the present invention have been achieved by providing in a cable hoist a drum rotatably mounted on a frame and having around its periphery a helical groove adapted to receive a cable wound around the drum; cable retaining means in the form of a cylindrical shroud surrounding the drum and the cable thereon to confine the cable to the drum groove; means supporting and guiding the shroud for movement axially of the drum; means moving the shroud axially of the drum in response to rotation thereof to uncover the shifting point of cable delivery; and means positively rotating the shroud in unison with the drum. The shroud has a length sufficient to cover substantially the maximum length of the drum on which the cable is wound so that the turns of the cable on the drum are at all times confined by the shroud.

The means for supporting and guiding the shroud and for rotating the shroud in unison with the drum include a plurality of rollers rotatably mounted on the drum to turn relative thereto about substantially radial axes and extending beyond the cable to engage longitudinally extending guide channels in the shroud whereby engagement of the rollers with the shroud not only rotates the shroud with the drum but supports the shroud out of engagement with the turns of cable for free axial or longitudinal movement of the shroud relative to the drum and the cable thereon.

How the above objects and advantages of the invention, as well as others not specifically mentioned, are attained will be better understood by reference to the following description and to the annexed drawings, in which:

FIG. 4 is a combined end elevation of the cable drum and transverse section through the shroud on line 4—4 of FIG. 1.

FIG. 5 is a fragmentary section on line 5—5 of FIG. 4 showing the anchor for one end of the cable.

FIG. 6 is a fragmentary side elevation of the traverse ring.

FIG. 7 is an enlarged fragmentary transverse section on line 7—7 of FIG. 6.

Figure 1:
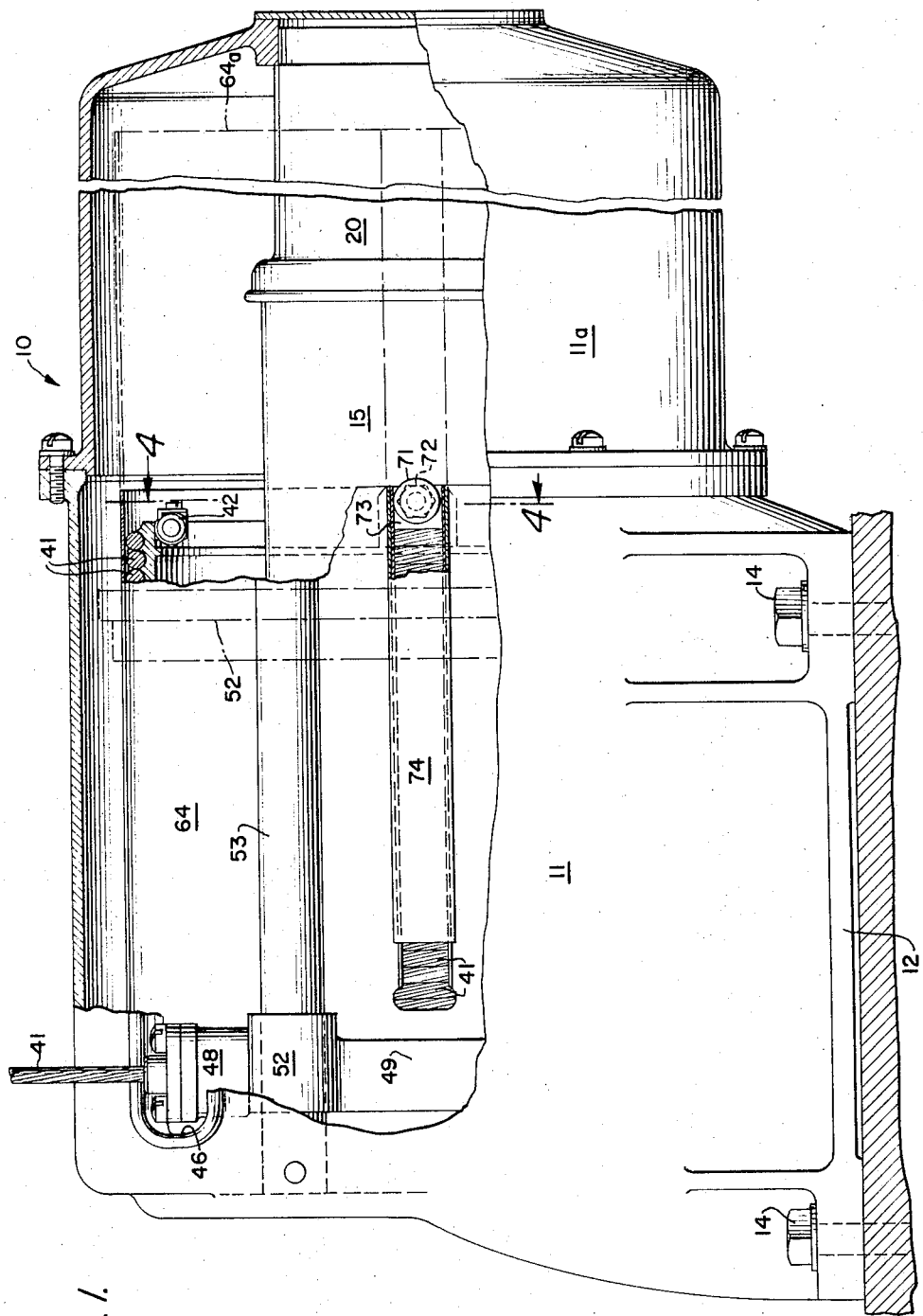
FIG. 1 is a side elevation of a cable hoist embodying the present invention with a portion of the outer housing broken away.
Figure 2:
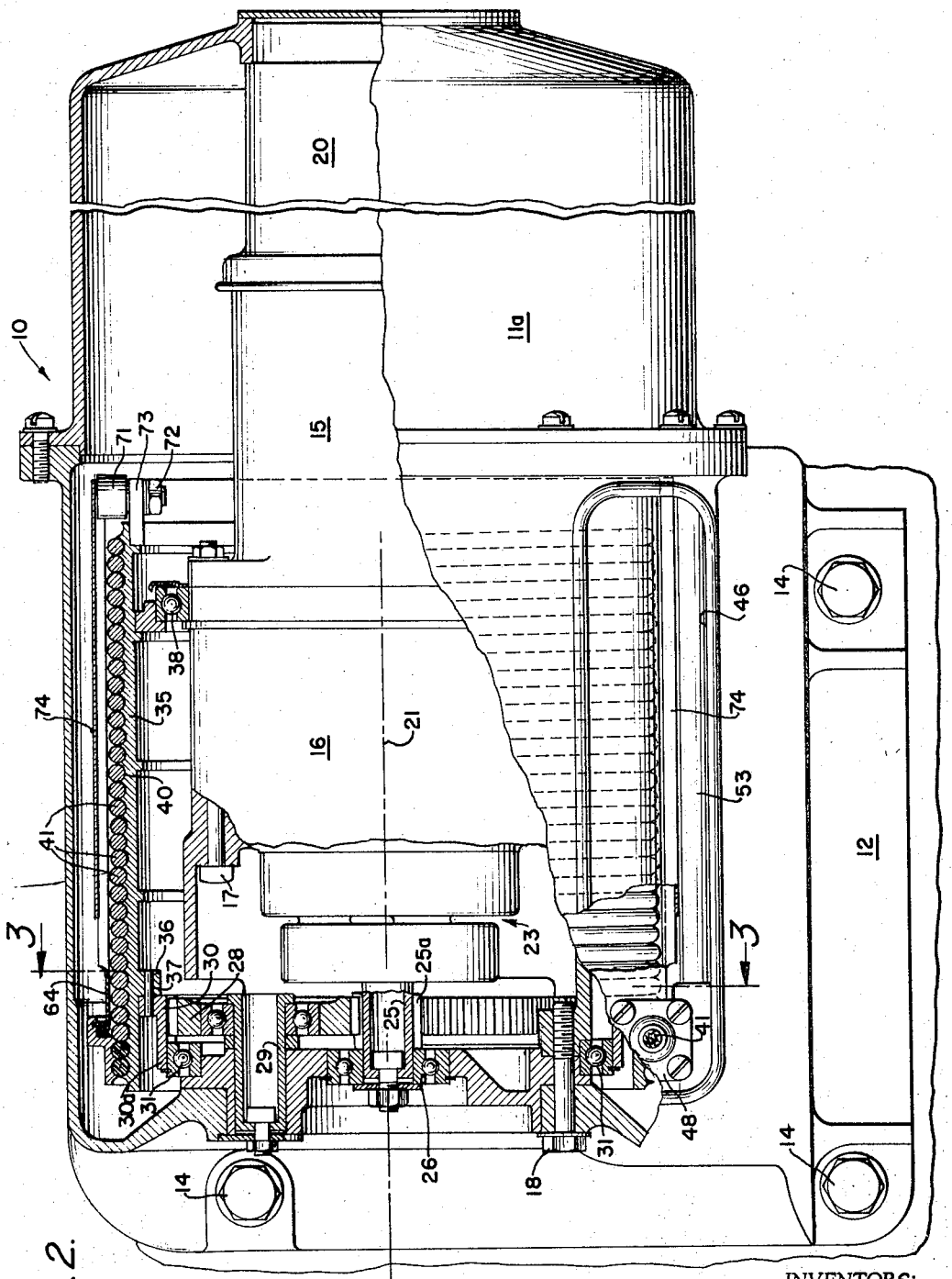
FIG. 2 is a combined plan and horizontal median section thereof.

The winch indicated generally at 10 in FIGS. 1 and 2 includes frame 11 provided with a base 12 adapted for mounting the winch on any suitable object, the base receiving bolts 14 for this purpose. Frame 11 serves as a housing enclosing all of the moving parts of the winch as well as a supporting structure for retaining in assembled position component parts of the winch. Housing 11 includes removable extension 11a which not only closes one end of the housing but also serves as a support for one end of the drive motor, as will become evident.

Motor 15 is mounted inside housing 11 and is non-rotatably attached to the housing. Motor 15 is partially surrounded by casing 16 attached to the motor by a plurality of bolts 17. The outer end of casing 16 projects beyond one end of motor 15 and is rigidly secured to frame 11 by plurality of bolts 18. The other end of motor 15 is supported by filler 20 which in turn engages and is supported by housing extension 11a. Motor 15 is thus supported within the housing with its axis 21 disposed horizontally. This axis, as will be seen, becomes the axis of rotation of the drum.

Figure 3:
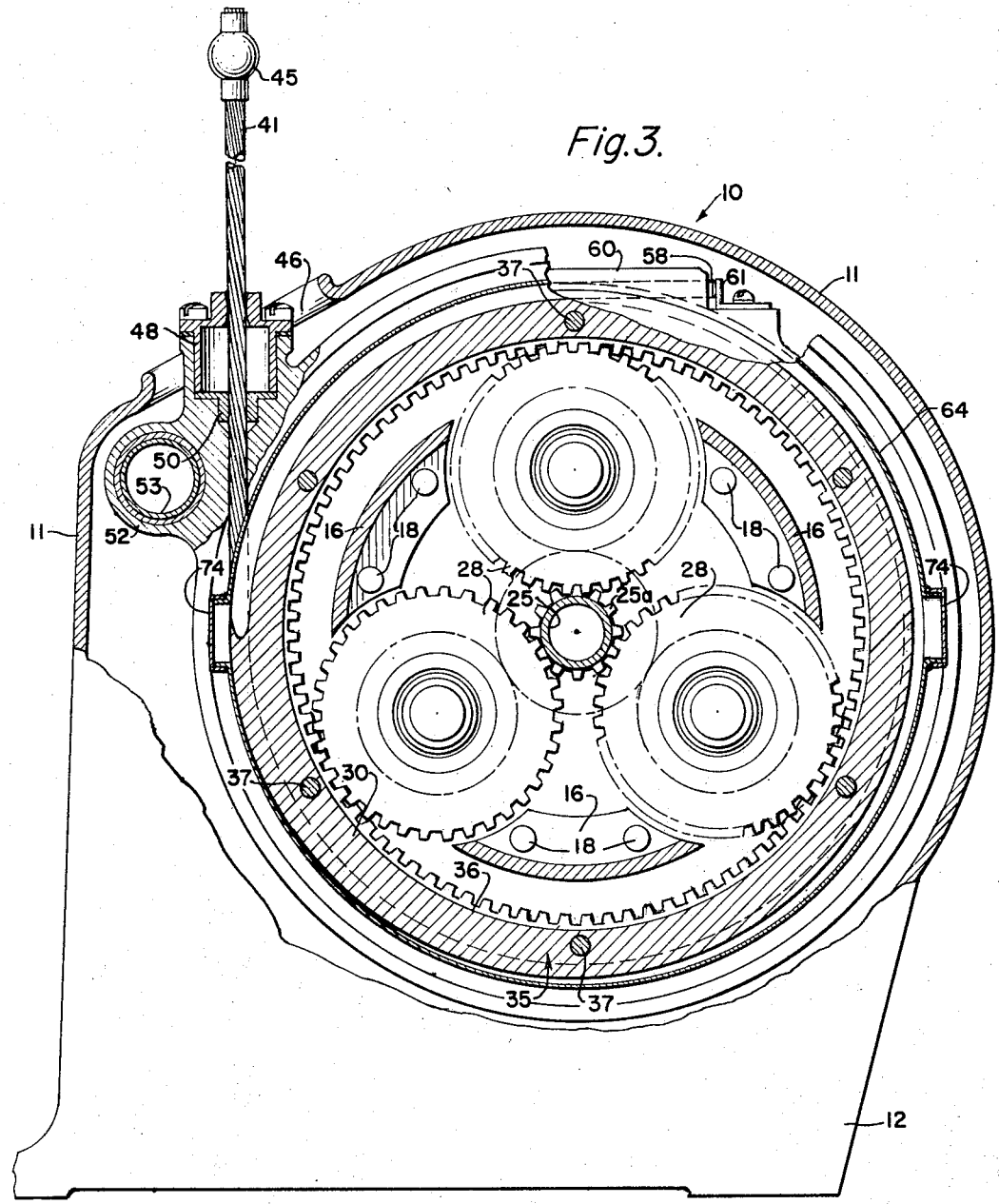
FIG. 3 is a vertical transverse section through the hoist on line 3—3 of FIG. 2.

The power train from the motor to the drum includes a first speed reducer indicated at 23. While this speed reducer may be of any suitable type, it is here shown as comprising a set of planetary gears. Shaft 25 is the output shaft from this speed reducer and it is mounted in the inner race of ball bearing assembly 26, the outer race of which is attached in any suitable manner to frame 11. Drive shaft 25 carries external spur gear teeth 25a which, as is most clearly seen in FIG. 3, mesh with a plurality of idler gears 28. Three of these idler gears are provided in order to obtain satisfactory load distribution; and each idler 28 is rotatably mounted on a stub shaft 29 attached to frame 11. The three idler gears 28 are surrounded by and meshed with ring gear 30 which is driven by the idler gears. The ring gear has an annular flange 30a by which the gear is mounted on the outer race of ball bearing 31 to rotate about axis 21, the inner race of bearing 31 being attached to frame 11.

Cable drum 35 is located inside housing 11 and surrounds motor 15 which provides the power to rotate the drum. Cable drum 35 is supported at one end upon ring gear 30. The drum has an internal flange 36 abutting one side face of the ring gear, the ring gear and drum flange being connected by a plurality of pins 37. At the other end, drum 35 is supported on the outer race of ball bearing 38 of which the inner race is mounted upon motor casing 16 concentrically of axis 21. In this way, drum 35 is rotatably mounted within the casing to be rotated by motor 15 about axis 21.

Drum 35 is provided externally with a helical groove 40 designed to receive cable 41 wound around the drum. As will be seen in FIG. 2, groove 40 is semi-cylindrical in cross-section and has a radius substantially equal to the radius of cable 41, so that the turns of the cable are received snugly in the groove and are closely spaced from each other when wrapped around the drum. The inner end of cable 40 is anchored to the drum by ball 42 securely attached to the end of the cable and releasably held in fitting 43 attached to the drum at one end thereof, as shown particularly in FIGS. 4 and 5. The other end of the cable is the free end and it is to this free end that the load is attached externally of housing 11. The free end of the cable may be provided with ball 45 (FIG. 3) or any other desired type of fitting by means of which the load can be connected to the cable.

In order for cable 41 to pass out of housing 11, the housing is provided in its upper side with a suitably located elongated opening 46 which, for reasons that will become evident, extends longitudinally of the housing for a distance substantially equal to the length of the drum upon which the cable is wound.

Cable 41 leaves groove 40 as it is unwound from the drum and passes through movable cable guide 48 which is conveniently made integral with traverse ring 49. One purpose of traverse rig 49 is to move the cable guide axially of the drum in order to maintain the guide exactly opposite the point of delivery of the cable, a point that shifts along the drum as the cable is wound and unwound. As may be seen in FIG. 3 particularly, cable guide 48 has a cable passage 50 through which the cable passes and which maintains the cable adjacent the drum in a position such that the cable is always tangent to the drum at the groove into which or from which the cable is moving.

In order to hold the traverse ring and the cable guide against rotation with the drum, the guide is provided with eye 52. Longitudinally extending guide rod 53 passes through eye 52 and is rigidly attached to housing 11 in any suitable manner. Thus eye 52 is free to slide longitudinally along guide rod 53 but is restrained thereby from rotation about axis 21.

In order to move traverse ring 49 axially of the drum in response to rotation thereof, ring 49 is provided with an internal groove 55, shown particularly in FIG. 7. Groove 55 is semi-cylindrical in cross-section and is of helical configuration, matching the pitch of groove 40 in drum 35.

The traverse ring 49 and drum 35 are coupled together by means in the form of flexible rod 58 which is of substantially the same diameter as the opposing grooves and lies partially in each of two opposing turns of grooves 40 and 55 to couple the traverse ring to the drum. Rod 58 slides within the drum groove and is fixed relative to the traverse ring. The rod engages the drum groove in the manner of a nut engaging the helical thread on a bolt and consequently the traverse ring moves axially of the drum in response to rotation thereof.

Coupling means 58 is held against relative movement with respect to ring 49 by means of two members. One of these members is abutment pin 59 which extends radially through ring 49 to engage and abut the inner end of flexible rod 58, as shown in FIG. 6. Rod 58 is preferably long enough to extend around drum 35 for substantially one full turn and the end of the rod then extends outside the ring through a bore in boss 60, the terminal portion of the rod being tangent to the drum as shown in FIG. 6. Mounted on the outside of the traverse ring, angle clip 61 engages the outer end of rod 58 to hold the rod against movement. Clip 61 is held in place by screw 62. By removing clip 61, rod 60 can be inserted in the two opposing grooves in the ring and drum to couple them together, or can be withdrawn to permit dissassembly of these elements.

It has been found highly satisfactory to make coupling rod 58 from one of the synthetic resins or plastics, especially a polytetrafluoroethylene commonly known as "Teflon." Such material provides the desired degree of flexibility together with a smooth external surface having a low coefficient of friction that slides easily over the surface of the drum groove. This combination greatly reduces friction between the elements as well as any tendency to bind.

Means for restraining the turns of the cable on the drum to hold them in place is provided in the form of cylindrical shroud 64. Shroud 64 surrounds the drum and the cable thereon with sufficient clearance to avoid ordinarily any contact or engagement with the turns of the cable. However, at the same time, the clearance between the cable and the inner face of the shroud is sufficiently small that the cable turns are held by engagement with the shroud from escaping from groove 40 and becoming fouled with each other or upon any other element of the hoist.

Shroud 64 has at one end a radially extending flange 64a by means of which the shroud is connected to traverse ring 49. The outside diameter of flange 64a is of such dimension that the flange fits within an annular recess in one end of ring 49. The flange is held within the recess by a split ring 65 which, when compressed, is also inserted in the recess following flange 64a and is allowed to expand into groove 66 in the traverse ring. When seated in groove 66, split ring 65 is locked in place and holds shroud 64 against substantial axial movement relative to traverse ring 49 while at the same time allowing the ring to rotate freely with respect to the shorud. It may be desirable to provide a spring washer, such as is indicated at 67, behind flange 64a to take up the slack between the flange and the body of ring 49.

Because of this connection between the traverse ring and the shroud, it will be apparent that the shroud is moved axially of the drum by the traverse ring in response to rotation of the drum. Thus, the shroud follows the movement of the ring as it maintains registration with the point of cable delivery from the drum. As the cable is uwound the direction of movement of the shroud from the full line position FIG. 1 is such as to uncover successive turns of the cable for delivery from the drum through cable guide 48. Conversely, as the cable was wound on to the drum, the shroud moves in a direction to cover or confine the successive turns of cable as it is wound on the drum.

Means for supporting and guiding the shroud during its movement axially of the drum as well as means for positively rotating the shroud in unison with the drum are provided. These means include a pair of rollers 71 mounted at diametrically opposite positions on the drum near one end thereof to rotate respectively about radial axes established by bolts 72 which fasten the rollers to brackets 71 on the end of the drum. There are two such rollers shown; but of course it will be realized that a larger number may be used if desired.

These means also include a pair of axially extending channels located at diametrically spaced positions on the shroud and recessed outwardly from the diameter of the main portion of the shroud, as may be seen in FIG. 4. The two rollers 71 engage the two channels. By contact with the side faces of the channels, the rollers support the shroud during its axial movement and also drive the shroud rotatably about longitudinal axis 21 in unison with the drum. Rollers 71 extend radially outwardly beyond the cable on the drum in order that they project into recesses 74. The clearance between the outer end of the rollers and the inner face of each of the channels is reduced to a minimum in order that the shroud is held by the rollers substantially concentric with axis 21 and clear of the turns of cable on the drum.

The axial length of the two channels 74 is great enough to permit the traverse ring and shroud to be moved for substantially the full length of the drum, bringing the shroud to some such position as shown in dotted lines at 49' and 64', respectively, in FIG. 1, thus allowing substantially the full length of the cable to be unwound from the drum.

From the foregoing description of the construction of the shroud and traverse ring which causes the shroud to move axially of the drum, it will be seen that according to the present invention retaining means are provided which at all times cover substantially the full length of the drum on which cable is wound so that all the turns on the cable are restrained against moving radially outward away from the drum and leaving groove 40. As a consequence, even though the tension is removed from the cable, as under a no-load condition or when the cable is being payed out without a load on it, the natural resilience of the cable is unable to loosen the turns around the drum sufficiently that they become fouled upon each other. Without a full shrouding, removal of tension on the cable permits the cable to creep backwardly on the drum, loosening the turns, which then spring away from the drum and become entangled upon each other in such a manner that the drum can no longer turn freely.

From the foregoing description it will be seen that various changes in the detailed construction and location of the various elements of the present device may be made by persons skilled in the art without departing from the spirit and scope of the present invention. Accordingly, it is to be understood that the foregoing description is considered as being illustrative of, rather than limitative upon the present invention.

We claim:

1. In a hoist, the combination comprising:
a frame;
a drum rotatably mounted on the frame and having around its periphery a helical groove adapted to receive a cable wound around the drum;
a shroud surrounding the drum and the cable thereon to hold the turns of the cable on the drum in the groove;
means supporting and guiding the shroud for movement axially of the drum;
means moving the shroud axially of the drum in response to rotation of the drum to uncover a shifting point of cable delivery;
and means positively rotating the shroud in unison with the drum, said means positively rotating the shroud includes axially extending guide means in the shroud and a roller rotatably mounted on the drum to turn about a substantially radial axis and extending beyond the cable on the drum to engage the guide means on the shroud whereby the engagement of the roller with the guide means causes the shroud to rotate in unison with the drum.

2. In a hoist, the combination comprising:
a frame;
a drum rotatably mounted on the frame and having around its periphery a helical groove adapted to receive a cable wound around the drum;
a shroud spaced from and surrounding the drum and the cable thereon to hold the turns of the cable on the drum in the groove;
structure means providing a mechanical link between the drum and the shroud, carried by the drum engaging the shroud to rotate the shroud in unison with the drum while allowing axial movement of the shroud relative to the drum;
and means moving the shroud axially of the drum in response to rotation of the drum, said last mentioned means includes:
a ring having an internal groove disposed immediately outside of and around a grooved portion of the drum;
means holding the ring against turning about the drum axis;
and means engaging the opposed grooves in the drum and the ring to shift the ring axially of the drum as the drum revolves.

3. In a hoist, the combination as in claim 2 in which the means engaging the opposed grooves is a length of flexible rod of substantially the groove diameter disposed partially in each of two opposing grooves.

4. In a hoist, the combination comprising:
a frame;
a drum rotatably mounted on the frame and having around its periphery a helical groove adapted to receive a cable wound around the drum;
a shroud surrounding the drum and the cable thereon to hold the turns of the cable on the drum in the groove;
means supporting and guiding the shroud for movement axially of the drum;
a ring having an internal helical groove disposed immediately outside of and around a grooved portion of the drum;
means holding the ring against turning about the drum axis;
means engaging the opposed grooves in the drum and the ring to shift the ring axially of the drum as the drum revolves;
and means cooperatively disposed between the shroud and the ring for imparting axial movement of the ring to the shroud.

5. In a hoist, the combination as in claim 4 in which the means engaging the opposed grooves is a length of flexible rod of substantially the groove diameter disposed partially in each of two opposing grooves.

References Cited

UNITED STATES PATENTS

| 1,550,114 | 8/1925 | Simpson. | |
| 2,868,504 | 1/1959 | Minty | 254—186 X |
| 2,926,867 | 3/1960 | Nardone | 254—186 X |
| 1,782,358 | 11/1930 | Lang | 242—157.1 |

FOREIGN PATENTS 1,156,212   8/1960   Sweden.

RICHARD E. AEGERTER, *Primary Examiner.*

SAMUEL F. COLEMAN, *Examiner.*

H. C. HORNSBY, *Assistant Examiner.*